United States Patent [19]
Balzer et al.

[11] 3,854,905
[45] Dec. 17, 1974

[54] STORAGE SYSTEM FOR TWO PHASE FLUIDS

[75] Inventors: Daniel Lee Balzer, Hamilton Square; Ralph Jones Lake, Jr., Cranbury, both of N.J.

[73] Assignee: RCA Corporation, New York, N.Y.

[22] Filed: Apr. 24, 1972

[21] Appl. No.: 246,525

[52] U.S. Cl. ................................................. 55/159
[51] Int. Cl. ............................................ B01d 53/00
[58] Field of Search ................. 55/159, 182; 220/22

[56] References Cited
UNITED STATES PATENTS

| | | | |
|---|---|---|---|
| 2,840,259 | 6/1958 | Steidl | 220/22 |
| 2,959,008 | 11/1960 | Caroli | 55/159 |
| 3,069,042 | 12/1962 | Johnson | 220/22 |
| 3,486,302 | 12/1969 | Paynter | 55/159 |
| 3,539,499 | 11/1970 | Chesnenak et al. | 55/159 |
| 3,689,051 | 9/1972 | Miller | 220/22 |

Primary Examiner—Charles N. Hart
Attorney, Agent, or Firm—Edward J. Norton; Joseph D. Lazar

[57] ABSTRACT

A storage system for two phase fluids using capillary structures to provide a simple passive propellant orientation device for use typically on a three-axis stabilized spacecraft. The propellant feed from the storage tank is enabled by internal capillary structures forming a continuous flow path for one of the two phase fluids (e.g. propellant) to the outlet region of the tank. For spacecraft application one fluid is a liquid propellant and the other fluid is a gaseous pressurant. The surface tension of the propellant is used as a capillary gas barrier thereby preventing any gas contamination of the liquid propellant being expelled or drawn from the tank. For use with both fluids as liquids, one liquid is selected as the propellant so that its property of wettability is greater than the wettability of the other liquid serving as a pressurant.

13 Claims, 4 Drawing Figures

STORAGE SYSTEM FOR TWO PHASE FLUIDS

BACKGROUND OF THE INVENTION

1. Field of the Invention

The present invention is directed to a storage tank and more particularly to a storage tank having a capillary structure for use as a passive orientation device for a stored fluid.

2. Description of the Prior Art

In the present state of the art of space technology auxiliary propulsion systems are provided for attitude control and station keeping of spacecraft developing thrusts in the order of 5 pounds or less. A typical propulsion control system is described in copending United Sates application, Ser. No. 221,955, filed Jan. 31, 1972, assigned to the assignee of the patent application.

Such systems must provide a reliable, uniform, efficient, and accurately controlled expulsion of the propellant from a storage tank without mixing a pressurant gas in the expelled propellant. Gas which is mixed with the expelled propellant causes erratic and inconsistent thrusts. To avoid the deleterious effects of mixing an inert gas pressurant (i.e., nitrogen) with a propellant, present active expulsion systems utilize metal diaphrams, elastomeric bladders, pistons and various other methods, to establish and maintain a physical separation of the two fluids. Foraminous members are also used to maintain fluids in separated phases. One example of a system using such members is disclosed in U.S. Pat. No. 3,486,302 issued on Dec. 30, 1969. such prior art systems, however, are complex, difficult to fabricate and do not effect the full use of the stored propellant fluid owing to the difficulty of expelling the fluid at terminal drain.

According to the present invention, a storage apparatus is provided for selecting one of two fluids continuously on demand from the apparatus until the selected fluid is substantially depleted. The apparatus includes a storage container having an inner surface, a first opening for admitting fluids, and a second opening for withdrawing the selected fluid from the container. The apparatus further includes a means for providing a continuous flow path of the selected fluid to the second opening, which includes an elongated member in the container disposed adjacent the inner surface and extending toward the second opening. This elongated member cooperates with the inner surface and the selected fluid to establish a continuous flow path for the selected fluid.

DETAILED DESCRIPTION OF PREFERRED EMBODIMENTS

The present invention is based on the principle of capillary phenomenon of fluids.

In practice, at least two immiscible fluids are provided with a storage tank constructed in accordance with the present invention. The fluids effect an interface by surface tension forces. As well known, surface tension is caused by the intermolecular cohesive forces that occur at the discrete boundary between two substances and/or two phases of the same substance. The surface tension of two immiscible fluids, such as a gas and a liquid, act as though there were a thin elastic membrane of substantially uniform tension at the surface of the fluid with the greatest cohesive molecular force, namely, the liquid.

A preferred embodiment of the invention in a force environment of low or zero-g field is in the form of a spherical storage tank 10 containing two fluids, one a gas, the other a liquid. The environment is considered a low or zero-g field when the statics or dynamics of a system relative to its traveling vehicle can be treated as though it were in fact a low acceleration field.

It should be understood, nevertheless, that the invention is not limited to a low or zero gravity field environment. As will become apparent in a later discussion, the invention may be practiced in any acceleration environment provided the fluids used have appropriate selected densities. In the preferred embodiment, a low or zero-g system eliminates the effect of differential weight (density) of the gas and the liquid. In the absence of the effect of the differential weight factor of the two fluids, in a low gravity environment or by the use of selective relative densities, the surface tension at the fluid interface becomes the dominant force which orients the two fluids and prevents their mixing. According to the invention, once the fluids are properly oriented in the storage tank 10, the pressure of the gas functions to expel the liquid from the tank 10 for distribution to user devices.

Figure 1:
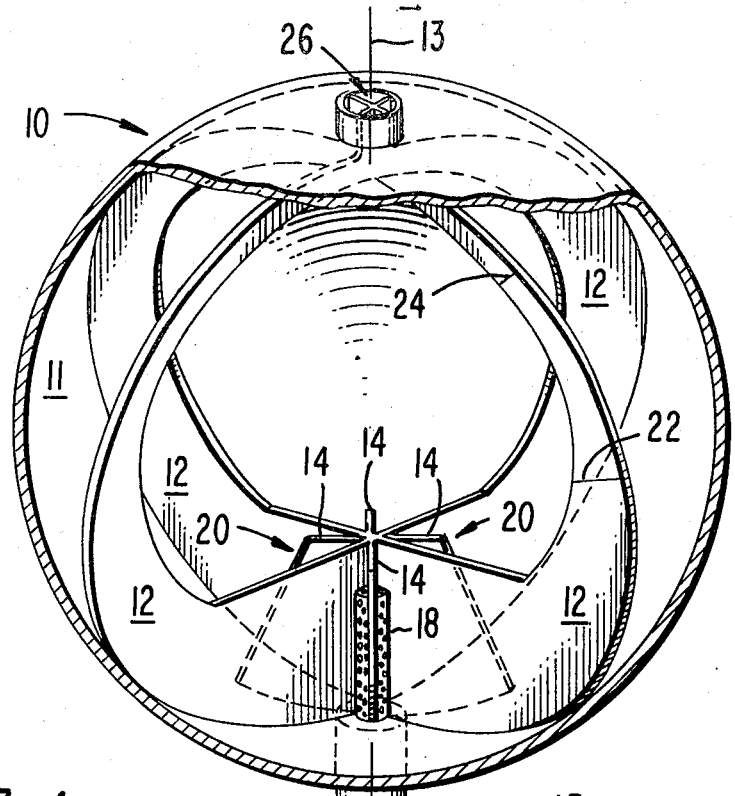
FIG. 1 is a perspective view of a spherical storage tank embodying the invention.

FIG. 1 shows, in perspective, a storage tank 10 in the form of a hollow spherical shell having an inner wall 11 of uniform thickness and an internal structural assembly to be described. The storage tank and the internal assembly are preferably made of a metal such as stainless steel. At the upper portion of the tank, there is provided a cylindrical input port 26 adapted to pass the fluids to the interior of the storage tank 10. At the lower portion of the spherical tank there is provided an output portion 16 for the preferential expulsion of only one of the fluids as will be described. Although the input port 26 and output port 16 are preferably cylindrical, any suitable form or shape may be provided. The ports 26 and 16 are diametrically positioned in accordance with the desired input-output flow of the fluids, although other locations of the ports may be provided as required. Further, more than one input port 26 or output port 16 may be provided. In providing additional output ports suitable modification of the arrangement of the internal structure may be required. The arrangement of the internal assembly required to allow for this multiplicity of ports will become apparent from the following description.

The internal structural assembly is formed of a configuration of a plurality of first 12 and second 14 members and an output port 16 of cylindrical form. The output port 16 is covered with foraminous material suitably a stainless steel screen. The first 12 and second 14 members have planar surfaces, serving as baffle surfaces, forming with the inner wall 11 fluid communication paths between the members and between the input port 26 and output port 16. The first 12 and second 14 members will hereafter be referred to as primary baffles 12 and secondary baffles 14, respectively. It should be understood, however, that the term "baffle" is not intended by such designation to restrict or limit the forms or functions of the members 12, 14, etc. Thus, as will be described, the baffle provides a surface medium on which surface tension phenomenon is manifested whereby capillary flow paths are established for the effluent, i.e., the expelled liquid.

The primary baffles 12 comprise, preferably, four symmetrical and evenly spaced truncated, crescent-shaped planar surfaces. Each primary baffle 12 extending in a radical direction from the inner wall 11, is preferably in close proximity to the inner surface of the shell. The baffles 12 may also be arranged to contact the inner surface 11 but the preferred arrangement provides for a slight gap. The slight gap provides for ease of manufacture and distortions in shape that may occur with severe environmental temperature variations. The primary baffles 12 extend along the inner wall of the spherical shell from the input port 26 to the output port 16 and join generally at the ends of the axis joining the input port 26 and output port 16. The width (radial dimension), and therefore the surface area of each of the primary baffles 12, should increase as the circumferential distance increases from the input port 26, providing thereby the largest surface area of the primary baffles 12 in the proximity of the output port 16. The increasing width of each baffle is indicated by the radial lines 24 and 22, respectively, of FIG. 1. The line 24, nearer the input port 26, is shown shorter (indicating a relatively small width) than the line 22 (indicating a relatively larger width) nearer the output port 16. Each of the baffles 12 is relatively thin in thickness. However, the thickness may be any convenient dimension. Any plurality of primary baffles 12 may be provided, depending upon the size and the shape of the tank and the type of fluids used.

The four primary baffles 12 are connected preferably to foraminous material in the shape of a closed cylinder 18 positioned at the tank outlet 16. The foraminous material acts as a capillary gas barrier to any gas which may be mixed in the liquid. Thus, the cylindrical screen 18 prevents any gas from mixing with the liquid being expelled at the output port 16 from the storage tank 10, and thereby assures a supply of liquid free of gas bubbles.

If the storage tank is used in a controlled environment such that the tank would not be subjected to any external acceleration or vibration (which may cause the gas to mix with the liquid) a mere aperture without a foraminous cover would be adequate for the port 16.

As part of the internal assembly, there may also be provided four secondary baffles 14. Similar to the primary baffles 12, the secondary baffles 14 have planar surfaces and are relatively thin. As shown in FIG. 1, the baffle surfaces 14 extend in a radial direction from the axis 13 between the input port 26 and output port 16. The secondary baffles 14 similarly are connected to the capillary cylinder 18 and are each positioned between an adjacent pair of primary baffles 12. The array of primary baffles 12 and secondary baffles 14 at the outlet port 16 form, thus, eight fluid reservoirs 15, best shown in the view of FIG. 3, with the outlet port 16 positioned at the base of these reservoirs. The surfaces of these baffles are substantially planar as previously indicated. However, the baffle surfaces may be curved or otherwise shaped such as to form the desired fluid paths along the junctions of the inner wall 11 of the sphere 10 and the baffle surfaces 12, 14, as well as between the baffle surfaces themselves.

The sphere 10 is formed preferably of two hemispherical segments. Each segment is formed such that the plane formed by the edge of the hemisphere bisects and is perpendicular to the axis 13 formed between the input port 26 and output port 16. Each primary baffle 12 is rigidly connected, such as by welding, to the capillary cylinder 18 such that the length of the baffle 12 extends in a radial direction from the axis of the cylinder 18. The secondary baffles 14 are similarly rigidly connected to the cylinder 18. The baffle and cylindrical assembly (12, 14, 18) is mounted within one of the hemispheres by affixing the capillary cylinder to an aperture, i.e., the output port 16. The baffle and cylinder assembly (12, 14, 18) is further rigidly mounted by affixing, such as welding, each of the primary baffles 12 to the inner surface of the sphere as at the edge of the hemisphere. The sphere 10 is then formed by suitably joining by welding or the like the two hemispheres protions at their edges.

In operation, the two fluids, one, suitably gaseous nitrogen, serving as the pressurant at 300 psi, and liquid hydrazine, serving as the propellant for a spacecraft, are received into the tank through the input port 26. In a low or zero-g environment the relative densities of the fluids have no force effect on the position or orientation of the liquid within the sphere.

The liquid selected should be of the type which will wet the material forming the inner surface 11 of the storage tank 10 and the baffles 12 and 14. The degree of wettability of a particular liquid on a particular solid surface as known in the art is determined by the liquid-to-surface contact angle $\theta$, the contact angle $\theta$ being the angle the surface of the liquid makes with the surface of the solid. Most common propellants are wetting (i.e., $\theta<90$) on the surface of metallic tanks with a near-zero-degree contact angle.

In the preferred embodiment, the storage tank is first partially filled with the liquid and a pressurized gas is subsequently fed therein. The liquid, in a low or zero-g environment, orients itself within the tank tending to position itself to form what may be termed a "free surface minimum energy configuration." It is the surface tension force of the liquid which acts on the volume of liquid or orient it into the shape or form manifesting a free surface minimum energy configuration. The liquid orients itself in the tank 10 such as to assume the position and shape within a given portion of the tank which produces the least amount of surface area of the gas and liquid interface. For example, if the spherical storage tank 10 did not have any internal assembly other than the inner surface 11 of the sphere, the liquid would orient itself as a hollow sphere to form a spherical gas bubble. A spherical shape is the form which manifests the minimum surface area of gas and liquid interface for the particular volume of liquid.

When the storage tank 10 is used in a propulsive system of a spacecraft, the propellant must be available at the output port 26 independent of spacial orientation and independent of the volume of remaining propellant. A description of the various stages in the expulsion of the propellant (liquid) from the storage tank 10, taking into account the effects of the changing proportions of the gas and liquid, will demonstrate the advantages of the present invention. As will be described, interreaction between the fluids and the surfaces in the storage tank produces a highly efficient expulsion of the liquid.

The shape of the liquid within the tank changes during the progress of the expulsion phases of the liquid. The form of the gas and liquid interface shapes itself in response to the expansion of the gas as the liquid is withdrawn from the tank on the surfaces of the assembly as though the interface was made of a thin contractible membrane of uniform tension between the liquid and the gas.

In considering the expulsion process of the liquid, attention is first directed to a phase when the volume of gas (ullage) within the tank is less than the void or the interior open portion of the primary baffles 12 i.e., when the baffle is completely immersed in the liquid. At this phase, the liquid orients itself independent of the effects of the baffles 12 and 14. As previously discussed, under these conditions, the free surface minimum energy configuration of the liquid forms substantially a spherical gas bubble. Under these conditions a sufficient volume of liquid is available at the output port 16, to assure that only the liquid fluid without the presence of gaseous bubbles is expelled from the tank under the pressure of the gas.

Figure 2:
FIG. 2 is a side elevation, partly in section, of the storage tank of FIG. 1.
Figure 2:
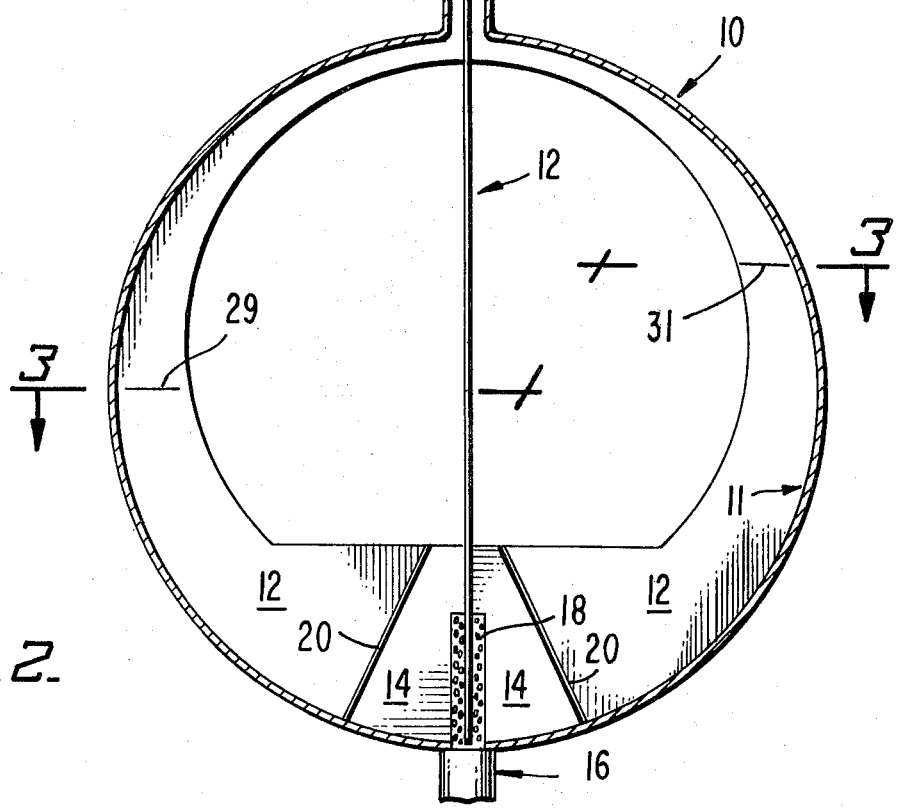
Figure 3:
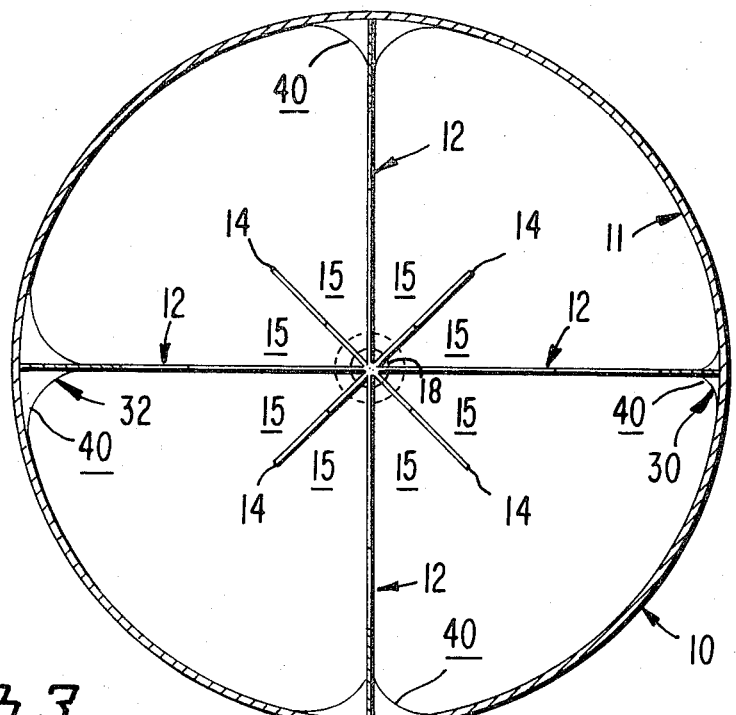
FIG. 3 is a sectional top view of the storage tank of FIG. 2, further showing the form of the liquid fillets provided according to the present invention.
Figure 4:
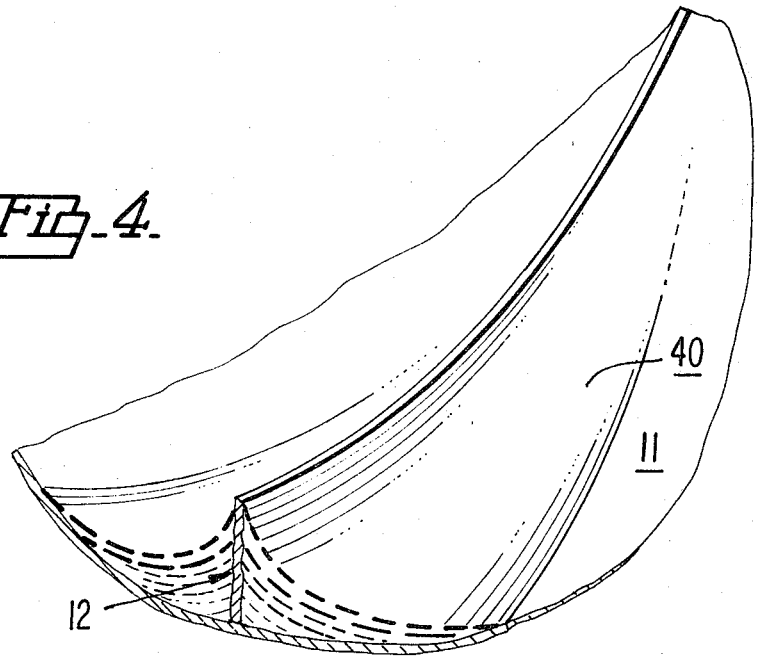
FIG. 4 is an enlarged fragmentary view of a fillet formed by the interaction of the fluid and the baffles in a spherical tank embodying the invention.

The second phase occurs when the ullage (gaseous portion) of the tank exceeds the void or the interior open portion of the baffles, which occurs after a certain amount of liquid propellant has been withdrawn. Since the liquid hydrazine has the property of a high degree of wettability on the metal surfaces, the liquid wets the inner surface 11 of the tank 10 and the baffles 12 and 14. The liquid, tending to orient itself to form the minimum surface energy configuration, forms fillets 40 of the general form as shown in FIG. 4. Fillet 40 assumes the shape which produces the minimum amount of gas/liquid interface surface area. The surface tension of the liquid tends to orient the liquid to the areas of the tank which will contain the largest volume of liquid for the least amount of surface area. As is shown in FIG. 2, and previously discussed, the surface area of the primary baffles is greatest, nearest to the outlet port 16. Accordingly, the large surface areas near the exit port 16 provide a larger reservoir for the liquid hydrazine to form these fillets than on the smaller area baffle portions. The gradual increase in the size of the fillets along these baffles 12, in indicated by two portions (30, 32) shown in FIG. 3. FIG. 3 it is noted, is a sectional view of the structure shown in FIG. 2 as seen along the viewing lines 3—3, further illustrating the liquid fillets now shown in FIG. 2.

The change in size of the fillets is illustrated by the relatively larger fillet 30, which corresponds to the larger surface area (portion 29) of the primary baffle 12, (FIG. 2) as compared to the relatively small fillet 32, which is positioned at the relatively small portion (31) of the surface areas of the primary baffle 12. The larger volume of a fillet oriented over the outlet port 16, assures sufficient fluid available for expulsion thereby minimizing the possibility of gas contamination of the expelling propellant.

The secondary baffles 14 are provided, if needed, to orient a significantly larger portion of the liquid over the outlet port 16. The additional surface area of baffles 14 can be arranged to double the number of the wedge-shaped reservoirs 15 of liquid directly over the output port 16. The liquid tends to orient itself into these smaller wedge-shaped reservoirs 15 developing smaller interfacial surface areas for a relatively larger total volume of fluid. This increased volume of liquid in the vicinity of the exit port 16 further assures that the fluid expelled is purely liquid without gaseous bubbles.

The secondary baffles 14 extend in a radial direction from the axis formed between inlet port 26 and the outlet port 16. These secondary baffles 14 extend only along a portion of the circumference of the sphere 10. The ends 20 farthest away from the axis 13 are inclined (see FIG. 2) so as to form the largest surface area of the baffle 14 near the outlet port 16. It should be appreciated that the larger volumes of liquid made available by increasing the number of liquid reservoirs (15) positioned over the outlet port 16 reduce the adverse environmental effects caused by acceleration and vibration. For example, if an axial force is applied to the storage tank 10 in a direction coincident with the desired direction of flow of liquid expulsion, the fluid with the greater inertia (e.g. the liquid) will tend to orient itself toward the input port 26. Accordingly, if a sufficient force were applied, the liquid could recede completely from the output port, thereby preventing the supply of liquid propellant if needed during the period of such an occurrence. Without secondary baffles 14, four primary baffles 12 forms four wedge-shaped (quadrant sized) reservoirs at the outlet port. Adding four secondary baffles 14, as explained above, effectively doubles the number of reservoirs. Accordingly a suitable number of reservoirs, should be provided as will be apparent to those skilled in the art to assure that any externally applied axial force may be withstood without the liquid receding away from the outlet port.

Certain principles of the dynamic behavior of fluids upon which the present invention is based is discussed in the National Aeronautics and Space Administration (NASA) publication, entitled, "The Dynamic Behavior of Liquids in Moving Containers," by H. Norman Abranson, particularly chapter 11. As discussed in that NASA publication a dimensionless number which is a measure of the forces acting on a liquid is known as the Bond Number $B_o$. The Bond Number is a measure of the relative magnitudes of gravitational and capillary forces, and is the pertinent parameter dileneating capillary-dominated and gravity-dominated hydrostatics.

The principal physical parameters effecting capillary forces of fluid orientation are: (1) the contact angle ($\theta$); (2) the surface tension ($\delta$); (3) the fluid density (p); and, (4) the characteristic radius of curvature of the capillary ($r$). The contact angle ($\theta$) is a measure of the wettability of the solid structure by the liquid. As previously discussed, the wettability is substantially 100 percent in a system of a liquid propellant such as hydrazine in a stainless steel container.

For Bond Numbers $B_o$ much less than one, capillary forces predominate and thus the liquid remains in its original position thereby opposing externally applied forces. Conversely, for Bond Numbers greater than one, the liquid will reorient itself tending away from the direction of the externally applied force. Thus, a force which may be externally applied to the storage tank without causing the capillary breakdown of the fillets is inversely proportional to the radius of curvature of the capillary fillet. Providing a larger number of secondary baffles therefore increases the number of wedge-shaped reservoirs thereby reducing the capillary radius and increasing the retention capability of the capillary device to maintain liquid over the output port.

If the storage tank 10 is subjected to vibrations, the gas/liquid interface will be disturbed and could allow the gas to immerse itself in the liquid as gas bubbles. In the absence of gravity or other externally applied forces, such gas bubbles will remain immersed in the liquid. To prevent such bubbles from passing through the output port 16, according to the invention, the cylindrical structure 18, previously described, is provided. The cylinder 18 as previously indicated is made of a foraminous material, preferably a screen of stainless steel and acts as a gas barrier to any immersed gas bubbles due to the capillary effect of a wetted screen. It should be understood that a wetted screen will prevent the passage of gas bubbles through the screen apertures wetted with liquid whose surface tension is sufficiently great to prevent gas under pressure from passing therethrough. The cylinder 18 is thus positioned over and completely encloses the output port 16 further preventing contamination of the exeplling liquid by the pressurant gas.

As mentioned previously, the invention is not limited in use to a low or zero gravity field. By matching the densities of two immiscible liquids, the fluid interface is dominated by the surface tension forces, as occurs in a zero gravity or space environment. It is known that, as the density of the two fluids is balanced, the Bond Number will approach zero ($B \rightarrow O$).

Thus if the Bond Number ($B_o$) is arranged by the appropriate selection of the physical parameters, i.e., make the relative densities of the two fluids equal, to be near or at zero, the capillary (surface tension) forces are dominating, while the environmental forces have little or no effect on the interface of the fluid.

According to the invention, by balancing the densities of two immiscible liquids within the storage tank 10, a condition which may be termed "neutral buoyancy" is achieved negating the effect of gravity at the liquid interface. Accordingly, the use of equal density fluids allows the practice of the invention at different acceleration fields.

The most common technique for testing the operation of a device in a low or zero-gravity environment is free-fall testing. A free-fall test consists of dropping a test device such as a storage container made according to the present invention from a predetermined height and allowing it to fall undisturbed to earth. Since all elements of the system are being accelerated at the same rate, the relative gravity-induced forces between the liquid, gas and container are zero. This procedure of free-fall testing is applicable to both static and dynamic conditions. A disadvantage of this technique is the limited test time available within practical free-fall heights. A height of 100 feet yields a free-fall time of only 2.6 seconds. The time required for liquid reorientation from its initial one-g configuration to a low-g condition is so short as to limit the model sizes that can be tested.

A more practical approach for either simulating a zero-gravity environment or operating the present invention in a one-g environment is the "neutral buoyancy" technique described above. This technique also may be used to demonstrate certain types of low-g dynamic characteristics of a system by controlling the mismatching of the densities of the two fluids. In practice of the "neutral buoyancy" procedure, the storage tank may be made of glass or metal (preferably stainless steel). The inner surfaces of the tank and the baffle members are coated with a non-adhesive material such as a plastic such as tetrafluoro ethylene ($C_2F_4$) also known as Teflon. The fluids used are water and a solution of chloroform and hexane. Under these conditions, the solution of chloroform and hexane preferentially wets the surface of the baffles and tank. This arrangement provides a near-zero-contact angle at the interface of the two fluids. The film of Teflon is particularly desirable in that it is sufficiently transparent to permit visual observation of the storage apparatus in operation.

The chloroform/hexane solution is mixed to a density near that of water and the two fluids are filled in the tank to the desired proportions, usually 60 percent water. The final density of the system is accurately achieved by adding drops of either the more dense chloroform or less dense hexane until neither liquid constituent exhibits a tendency to rise. In this condition the interface does not vary with its orientation in space. It should be noted, since the two liquids have different density-temperature characteristics thermal gradients in the system environment cause density imbalances and interface distortion. Nevertheless, an environment controlled to within a few degrees (such as most room-temperature environments) is satisfactory for low-g simulations of the apparatus of the invention.

Notwithstanding the above-mentioned undesirable effects of thermal gradients, the thermal density shift can be used to an advantage. A thermally controlled chamber may be used to simulate low-g environments for the apparatus of the invention such as those created during spacecraft engine thrust periods. By raising or lowering the temperature, low level acceleration forces are simulated. The effective acceleration or g-level being simulated can be calibrated by using a reference interface of the same liquids in the straight section of a cylinder. Both are placed in a temperature controlled chamber and the chamber temperature is adjusted to different values. By comparing the meniscus shape in the standard cylinder with a known Bond Number ($B_o$) curve, the effective g-level or acceleration force may be determined. Thus the neutral buoyancy technique according to the invention can also demonstrate static interfaces occurring during the thrusting and other perturbation periods during a spacecraft mission.

It should now be appreciated and understood, that a storage container of a two phase fluid made in accordance with the present invention provides the means for supplying one of the fluids substantially continuously until depleted from the container. Baffles provide the medium with the inner surface of the container for the fluid path that preferentially causes the fluid to flow on demand to an outlet port. The wettability of the desired fluid being greater than the wettability of the other fluid establishes an optimum interface configuration between the fluids based on capillary action. As the fluid is depleted, the interface assumes the shape of fillets at the intersections of the baffles and container. The larger baffle areas nearer the output port develop the larger reservoirs of the fluid near the output port. For use of the invention in low or zero-g environments, such as for orbiting satellite applications, the fluid for supply is a propellant such as hydrazine, and the other fluid is a pressurant such as nitrogen. The two fluids are immiscible and their relative densities have no effect on the interface. The invention for use in gravity environment requires that the fluids have substantially equal densities so that the gravity effect is neutralized. The fluid desired for supply preferably has a greater wettability than the other immiscible fluid which serves to expel the supplied fluid and must have a preferential wetting property to the container and baffle surfaces. Thus, the supply fluid must have relatively better wettability to the surfaces as compared to the wettability of the other fluid.

Although the invention is primarily intended for use as a storage container of a propellant for orbiting satellites, it will be apparent that the invention may be used for the supply of a selected one of two fluids in the manner described.

What is claimed is:

1. A storage apparatus for providing a selected one of two fluids from the storage apparatus continuously on demand until the selected fluid is substantially depleted, said selected fluid being a liquid, comprising:
    a closed storage container having an inner surface;
    a first opening for admitting fluids into said container;
    a second opening for withdrawing said selected fluid from said container; and
    means for providing a continuous flow path of said selected fluid to said second opening,
    said means including a generally planar elongated member in said container disposed adjacent said inner surface and extending toward said second opening,
    said member being positioned along said inner surface to form a corner with a portion of the surface of said member and a portion of the inner surface to support a flow path of fillets of liquid as liquid in said container is depleted,
    said inner surface and the surface of said member being formed of a material that is preferentially wetted by said selected fluid whereby said flow path only of said selected fluid is continuously maintained to said second opening as said selected liquid is depleted from said apparatus, said selected fluid flowing to said second opening along a fillet path formed by capillary action in said corner of said member and said inner surface,
    the respective densities of said two fluids being selected such that the flow of said selected fluid is substantially independent of body forces on said apparatus subjected to acceleration fields.

2. A storage apparatus according to claim 1 wherein said elongated member is formed so that the exposed surface area thereof increases as the distance from the output port decreases.

3. A storage apparatus according to claim 1 including:
    a plurality of said members disposed in substantially symmetrical relation within said container to provide thereby a plurality of flow paths.

4. A storage apparatus according to claim 1 wherein said elongated member extends from said second opening to said first opening.

5. A storage apparatus according to claim 1 wherein said two fluids are liquids and said selected liquid has a higher degree of wetting on the surface of said elongated member and the inner surface of said container than the other of said two liquids.

6. A storage apparatus according to claim 5 wherein the density of each of said liquids is substantially equal.

7. A storage apparatus according to claim 1 further including a second member in said container disposed adjacent said inner surface and extending from said second opening.

8. A storage apparatus according to claim 3 including a plurality of said second members disposed in substantially symmetrical relation within said container and said elongated member for providing additional flow paths for said selected fluid.

9. A storage apparatus according to claim 1 wherein said container is a hollow sphere.

10. A storage apparatus according to claim 1 further including foraminous means positioned over said second opening.

11. A storage apparatus according to claim 5 wherein said selected liquid is a mixture of chloroform and hexane and said other liquid is water, said members and said inner surface being coated with tetrafluoro ethylene.

12. Storage apparatus according to claim 1 wherein one edge of said member is contiguous with said inner surface.

13. A storage apparatus for providing a selected one of two fluids from the storage apparatus continuously on demand until the fluid is substantially depleted, said selected fluid being a liquid, comprising:
    a closed spherical storage container having an inner surface;
    a first opening for admitting fluids into said container;
    a second opening for withdrawing said selected fluid from said container;
    means for providing a continuous flow path of said selected fluid to said second opening,
    said means including a plurality of generally elongated planar members in said container disposed adjacent and extending along said inner surface between said first opening and said second opening,
    each of said elongated members having a width extending radially from said inner wall, wherein said width of each of said elongated members increases continuously from said first opening to said second opening,
    each of said members being respectively positioned and spaced from each other along said inner surface to form a corner with a portion of the surface of the respective planar surfaces of each of said members and a portion of the inner surface to support a flow path of fillets of liquid in each of said corners as liquid in said container is depleted,
    said inner surface and the surfaces of each of said members being formed of a material that is preferentially wetted by said selected fluid whereby said flow path only of said selected fluid is continuously maintained to said second opening as said selected fluid is depleted from said apparatus, said selected fluid flowing to said second opening along fillet paths formed by capillary action in each of said corners of each of said members and said inner surface, the respective densities of said two fluids being selected such that the flow of said selected fluid is substantially independent of body forces on said apparatus subjected to acceleration fields.

* * * * *